(12) United States Patent
Kangas et al.

(10) Patent No.: US 8,401,106 B2
(45) Date of Patent: Mar. 19, 2013

(54) INTERFERENCE REJECTION COMBINING FOR MULTI-USER MIMO TELECOMMUNICATIONS SYSTEM

(75) Inventors: Ari Kangas, Lidingö (SE); Reihaneh Malekafzaliardakani, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 270 days.

(21) Appl. No.: 12/997,116

(22) PCT Filed: Jul. 14, 2008

(86) PCT No.: PCT/SE2008/050870
§ 371 (c)(1),
(2), (4) Date: Dec. 9, 2010

(87) PCT Pub. No.: WO2010/008327
PCT Pub. Date: Jan. 21, 2010

(65) Prior Publication Data
US 2011/0085627 A1    Apr. 14, 2011

(51) Int. Cl.
*H04B 7/02* (2006.01)
(52) U.S. Cl. ........................................ 375/267
(58) Field of Classification Search .................. 375/267
See application file for complete search history.

(56) References Cited

U.S. PATENT DOCUMENTS

| | | | |
|---|---|---|---|
| 2009/0042618 A1* | 2/2009 | Hedayat et al. | 455/562.1 |
| 2009/0323840 A1* | 12/2009 | Lee et al. | 375/260 |
| 2010/0081399 A1* | 4/2010 | Zangi | 455/114.3 |

FOREIGN PATENT DOCUMENTS

JP    2008-228295    9/2008

OTHER PUBLICATIONS

International Search Report for PCT/SE2008/050870, mailed Jun. 22, 2009.
International Preliminary Report on Patentability for PCT/SE2008/050870, dated May 11, 2010.
Thiele, L. et al., "Capacity Scaling of Multi-User MIMO with Limited Feedback in a Multi-Cell Environment", Signals, Systems and Computers, (Nov. 4, 2007), pp. 93-100.

(Continued)

*Primary Examiner* — Don N Vo
(74) *Attorney, Agent, or Firm* — Nixon & Vanderhye P.C.

(57) ABSTRACT

Method and apparatus are provided for processing a received signal for making a symbol estimate of a symbol included in a signal transmitted in a Multiple-Input-Multiple-Output (MIMO) system. In an example mode, the method comprises (1) providing at least a subset of precoding matrices which are candidates for use in transmission of an interfering signal in a MIMO system; (2) using the received signal and plural candidates of the subset to determine corresponding plural covariance matrices, each of the plural covariance matrices being formed using a corresponding candidate precoding matrix; (3) determining which of the candidates is a trace minimizing candidate which is associated with one of the plural covariance matrices that has a minimum trace value; (4) forming a weighting matrix using the trace minimizing candidate; and (5) using the weighting matrix to make the symbol estimation.

4 Claims, 6 Drawing Sheets

OTHER PUBLICATIONS

English Summary of Japanese Office Action mailed Oct. 9, 2012 in Japanese Application No. 2011-518680.

Cheng Wang et al., "MU-MIMO Decomposition Transmission with Limited Feedback", Wireless Communications and Networking Conference, 2007.WCNC 2007, IEEE, Mar. 15, 2007, pp. 1109-1114.

Michael Joham et al., MMSE Optimal Feedback of Correlated CSI for Multi-user Precoding, Acoustics, Speech and Signal Processing, 2008, ICASSP 2008. IEEE International Conference on Apr. 4, 2008, pp. 3129-3132.

Shohei KATO 4 et al., Imperfect Block Diagonalization for Downlink Multiuser MIMO Systems, The Technical Report of the Proceeding of the Institute of Electronics, Information and Communication Engineers, Feb. 27, 2008, vol. 107, No. 518, pp. 329-334, RCS 2007-241.

* cited by examiner

INTERFERENCE REJECTION COMBINING FOR MULTI-USER MIMO TELECOMMUNICATIONS SYSTEM

This application is the U.S. national phase of International Application No. PCT/SE2008/050870, filed 14 Jul. 2008, which designated the U.S., the entire contents of which is hereby incorporated by reference.

TECHNICAL FIELD

This invention pertains to wireless telecommunications, and particularly the use of wireless communication over channels having multiple transmit and multiple receive antennas.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Future wireless systems include long term evolution (LTE) and Worldwide Interoperability for Microwave Access (WiMAX). Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Thus, 3GPP LTE (Long Term Evolution) is the name given to a project within the Third Generation Partnership Project to improve the UMTS mobile phone standard to cope with future requirements. See, e.g., Dahlman et al, 3G Evolution; HSPA and LTE for Mobile Broadband, Academic Press Inc., U.S., 2007, and 3GPP TS 36.211, Physical Channels and Modulation.

WiMAX is a telecommunications technology aimed at providing wireless data over long distances in a variety of ways, from point-to-point links to full mobile cellular type access. See IEEE 802.16-2004 Standard for Local and metropolitan area networks Part 16: Air Interface for Fixed Broadband Wireless Access Systems LTE and WiMAX utilize Multiple-Input Multiple-Output (MIMO) transmission schemes to increase the spectral efficiency. MIMO schemes assume that the transmitter and receiver are both equipped with multiple antennas, and that multiple modulated and precoded signals are transmitted on the same "time-frequency resource element". See FIG. 6 and FIG. 7. FIG. 7 is arranged to have matrices in three rows and four columns. The first column of FIG. 7 is for antenna port 0; the second column of FIG. 7 is for antenna port 1; the third column of FIG. 7 is for antenna port 2; the fourth column of FIG. 7 is for antenna port 3. The top row of FIG. 7 is for one antenna port; the middle row of FIG. 7 is for two antenna ports; the bottom row of FIG. 7 is for four antenna ports. Each matrix of FIG. 7 also has rows and columns. The first seven columns of each matrix are for even-numbered slots; the last seven columns of each matrix are for odd-numbered slots.

In MIMO technology, mathematically the transmitted signal for a particular frequency/time resource element (k,l) can be expressed by Expression (1).

$$x(k,l)=W(k)s(k,l) \qquad \text{Expression (1)}$$

In Expression (1), s is a vector with elements $S_i$, $i=1, \ldots, N_s$, and where $S_i$ is a modulated symbol and $N_s$ is the number of transmitted layers; W(k) is the so-called precoding matrix of dimension $N_{tx} \times N_s$, where $N_{tx}$ is the number of transmitted antennas; x is a vector of transmitted signals, where $x_i$, $i=1, \ldots, N_{tx}$, is the signal transmitted from the ith transmit antenna. As used herein, "k" and "l" are the frequency and time indices, respectively, and each element in vectors x and s are given for a particular frequency/time.

The signal is transmitted over a channel which can be characterized by a channel matrix H, the channel matrix H being of dimension $N_{rx} \times N_{tx}$, where $N_r$ is the number of received antennas. The received signal vector is then an $N_{rx}$ dimensional vector given by Expression (2).

$$y=Hx+e=HWs+e \qquad \text{Expression (2)}$$

In Expression (2), e is a noise and interference vector, with covariance matrix $R_e$. In the following text the indices (k,l) have been omitted to simplify notation.

Several known techniques exist for demodulating the signal s from the received data, e.g., from the received signal vector y. Among the demodulation techniques are the Minimum Mean Square Error (MMSE) technique and the Interference Rejection Combining (IRC) technique. The Interference Rejection Combining (IRC) technique typically uses an expression such as Expression (3).

$$\hat{s}_i = \lambda g_i^H (GG^H - g_i g_i^H + R_e)^{-1} y \qquad \text{Expression (3)}$$

Expression (3) provides an estimate of the $i^{th}$ transmitted signal. In Expression (3), $G=HW=[g_1, \ldots g_s]$; $\lambda$ is a scaling factor that makes the estimator unbiased. In Expression (3) and elsewhere herein, the superscript H denotes a Hermitian transpose. The receiver requires knowledge of the channel H (which can be estimated using reference symbols), the precoder matrix W used for the transmitted signal (which is usually signalled to the UE), and the covariance matrix $R_e$.

The covariance matrix $R_e$ can, e.g., be estimated using, e.g., the residuals from the channel estimation.

A special case arises when W is a column vector, i.e., when $N_s=1$. In this case a Maximum Ratio Combining (MRC) receiver as depicted by Expression (3b) can be utilized.

$$\hat{s}_t = \lambda g_t^H R_e^{-1} y \quad \text{Expression (3b)}$$

Multi-User MIMO (MU-MIMO) is an extension of MIMO where signals are transmitted to multiple users, such that a transmitter signal to a first user is depicted by Expression (4a) and a transmitter signal to a second user is depicted by Expression (4b).

$$x_1 = W_1 s_1 \quad \text{Expression (4a)}$$

$$x_2 = W_2 s_2 \quad \text{Expression (4b)}$$

At the first receiver/user of a MU-MIMO system, the received signal is depicted by Expression (5).

$$y = H(W_1 s_1 + W_2 s_2) + e = HW_1 s_1 + HW_2 s_2 + e \quad \text{Expression (5)}$$

For such first receiver/user, the desired signal is $HW_1 s_1$, and accordingly the noise plus interference is provided by Expression (6). The noise plus interference has a covariance matrix described by Expression (7).

$$v = HW_2 s_2 + e \quad \text{Expression (6)}$$

$$R_v = HW_2 W_2^H H^H + R_e \quad \text{Expression (7)}$$

For a MU-MIMO system, the receiver/user equipment unit (UE) can (as mentioned above) estimate the channel matrix H based on reference symbols transmitted from all transmit antennas. The reference symbols are typically transmitted on orthogonal resources, i.e. a resource element used for transmitting reference symbols from one antennas is not used by any other antenna, essentially in the manner illustrated by FIG. 2. As a consequence, the interference part of Expression (5) is not possible to estimate using reference symbols only, since these carry no information about the term $HW_2 s_2$.

Thus, in the existing technology it is difficult to estimate the noise for a MU-MIMO transmission. One attempted prior art solution was to signal explicitly to a receiving user equipment unit (UE) which precoder matrix $W_2$ is used for transmission to the other user equipment unit, so that the receiving user equipment unit could try to determine the noise caused by the other user equipment unit. However this signaling of precoder matrix for another UE costs too much in terms of, e.g., signalling overhead.

Another attempted prior art solution was to use the aforementioned Minimum Mean Square Error (MMSE) technique. In the Minimum Mean Square Error (MMSE) technique, the weights ($R_v$) are defined by Expression (8), which in turn is utilized by Expression (9) to determine symbol estimate $\hat{s}_t$.

$$R_v = \frac{1}{N_{RE}} \sum_{k,l} y(k,l) y(k,l)^H \quad \text{Expression (8)}$$

$$\hat{s}_t = \lambda g_t^H R_v^{-1} y \quad \text{Expression (9)}$$

A receiver that uses the Minimum Mean Square Error (MMSE) technique performs rather well in presence of MU-MIMO interference, but in absence of such interference, performance degrades. So from a robustness point of view, Minimum Mean Square Error (MMSE) technique is not a practical solution, since it needs to know when interference is present or not.

What is needed, therefore, and an object and/or advantage of the present invention, are one or more of apparatus, systems, methods, and techniques which facilitate noise estimation for MU-MIMO transmissions.

SUMMARY

In one of its aspects the invention concerns a method of processing a received signal for making a symbol estimate of a symbol included in a signal transmitted in a Multiple-Input Multiple-Output (MIMO) system. In an example mode, the method comprises the acts or steps of: (1) providing at least a subset of precoding matrices which are candidates for use in transmission of an interfering signal in a MIMO system; (2) using the received signal and plural candidates of the subset to determine corresponding plural covariance matrices, each of the plural covariance matrices being formed using a corresponding candidate precoding matrix; (3) determining which of the candidates is a trace minimizing candidate which is associated with one of the plural covariance matrices that has a minimum trace value; (4) forming a weighing matrix using the trace minimizing candidate; and (5) using the weighting matrix to make the symbol estimate.

The act of forming each of the plural covariance matrices comprises, in an example implementation, using the corresponding candidate precoding matrix; a received signal vector; a channel matrix which at least partially describes a channel over which the received signal is transmitted. In an example embodiment, the act of forming the weighing matrix comprises using the trace minimizing candidate, the channel matrix, and a covariance matrix of a noise term.

In an example implementation, the method comprises providing a set of precoding matrices and then associating one of the matrices of the set as a precoding matrix for the transmitted signal, the subset comprising the set excepting the precoding matrix that is associated with the transmitted signal.

In another of its aspects the invention concerns a wireless terminal comprising an antenna and a signal processor. The antenna is configured to receive a received signal which is obtained over a wireless interface in a Multiple-Input Multiple-Output (MIMO) system. The signal processor is configured to use the received signal to make a symbol estimate of a symbol included in a transmitted signal intended for the wireless terminal.

In an example, non-limiting embodiment, the signal processor comprises a memory; a covariance matrix generator; a trace checker function; a weighting matrix generator; and a symbol estimator. The memory stores, e.g., at least a subset of precoding matrices which are candidates for use in transmission of an interfering signal in the MIMO system. The covariance matrix generator is configured to use the received signal and plural candidates of the subset to determine corresponding plural covariance matrices, each of the plural covariance matrices being formed by the covariance matrix generator using a corresponding candidate precoding matrix. The trace checker function is configured to determine which of the candidates is a trace minimizing candidate (the trace minimizing candidate being associated with one of the plural covariance matrices that has a minimum trace value). The weighting matrix generator is configured to form a weighing matrix using the trace minimizing candidate. The symbol estimator is configured to use the weighting matrix to make the symbol estimate.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
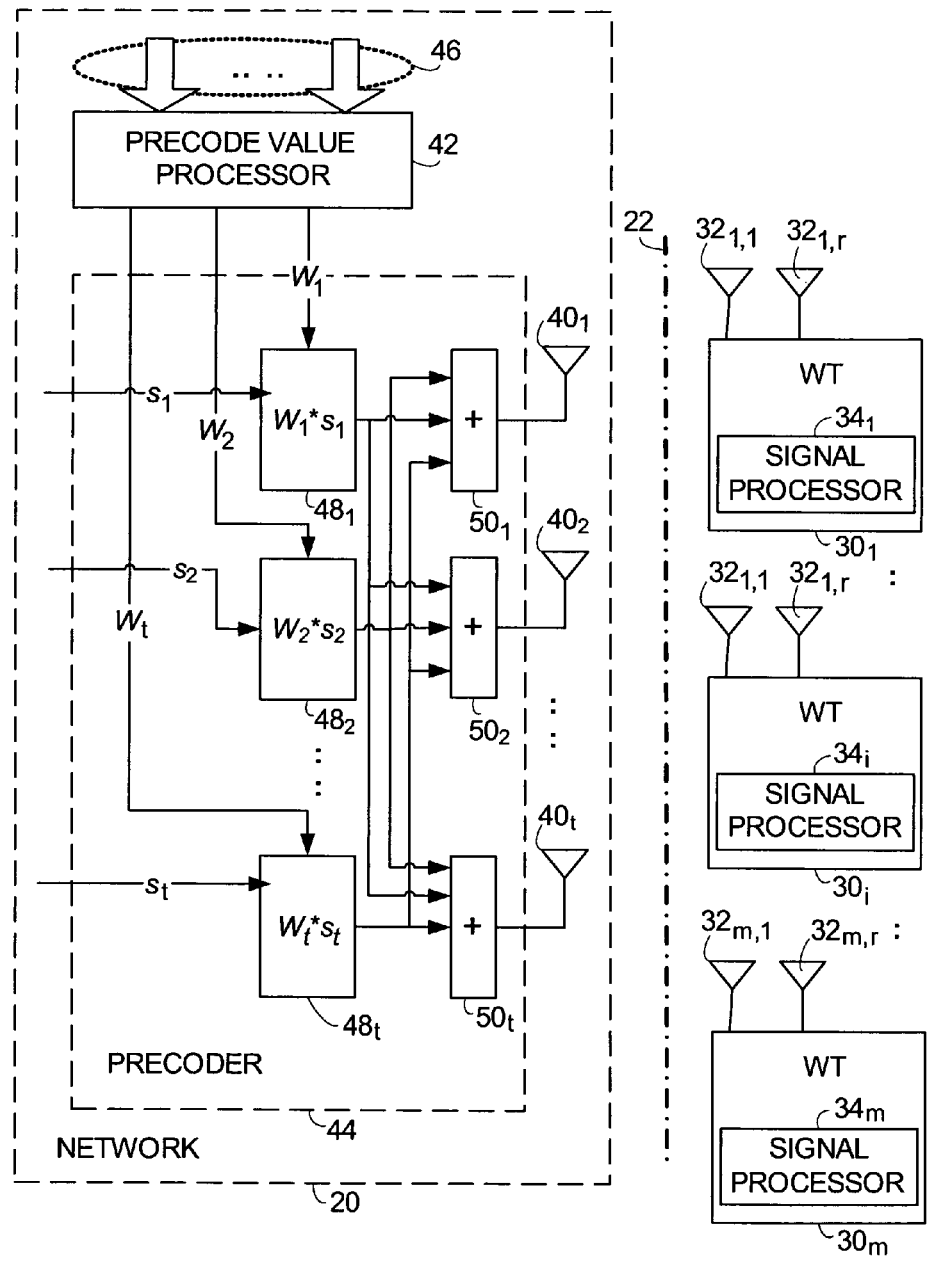
FIG. 1 is a diagrammatic view of a wireless network comprising plural transmitters for communicating with plural wireless terminals.

FIG. 1 illustrates an example, non-limiting wireless network 20 which provides an example environment suitable for implementation of the present technology. Wireless network 20 participates in radio frequency communication over a radio or air interface 22 with plural wireless terminals 30, such as wireless terminals $30_1$ through $30_m$. Each of the wireless terminals 30 is shown as having plural receivers, e.g., plural antennas 32. For example, wireless terminal $30_1$ has antennas $32_{1,l}$ through $32_{1,r}$; wireless terminal $30_2$ has antennas $32_{2,l}$ through $32_{2,r}$; and so forth so that wireless terminal $30_i$ has plural antennas $32_{i,l}$ through $32_{i,r}$ and wireless terminal $30_m$ has plural antennas $32_{m,l}$ through $32_{m,r}$. While it so happens that the FIG. 1 illustration shows each of the wireless terminals 30 as having the same number (e.g., "r" number) of antennas, such need not be the case as different wireless terminals 30 can have differing numbers of antennas. Moreover, each wireless terminal 30 comprises a signal processor 34 (i.e., wireless terminal $30_1$ comprises signal processor $34_1$; wireless terminal $30_2$ comprises signal processor $34_2$; and so forth.

Network 20 comprises plural transmitters 40 (e.g., transmitters $40_1$ through $40_t$); precoder value processor 42; and, precoder 44. Each transmitter 40 comprises a transmitting antenna, and in such sense the terms "transmitter" and "antenna" are utilized interchangeably. Precoder value processor 42 is configured to develop a set of linear precoder values. The precoder values may in general be frequency dependent, but for simplicity of notation it will hereinafter be assumed that the precoder values are frequency-independent. Precoder 44 is configured to use the precoder values developed by precoder value processor 42 for encoding the signals transmitted from the plural transmitters 40.

The precoder value processor is configured to develop a set of (e.g., frequency-independent, linear) precoder values W (e.g., $W_1 \ldots W_t$) used to encode the signals transmitted from the plural transmitters. The set of precoder values W can take the form of a linear precoding matrix, where the t-th column of W is the vector $W_t$. Each precoding vector Wi is associated with one wireless terminal $30_i$.

The transmitters 40 of the wireless network 20 can be co-located at a same node of wireless network 20, or not co-located. By "not co-located" includes scenarios in which the transmitters 40 are situated at different nodes of wireless network 20 or situated at differing locations of the same node. A "node" can be, for example, the type of nodes that is referred to as a base station transceiver, a radio base station, or a NodeB (e.g., BNode).

As shown in FIG. 1, in order to develop the set of precoder values W, precoder value processor 42 receives inputs 46 as described herein. The set of precoder values W are applied to precoder 44. In particular, each precoder value $W_j$ is applied to a first input terminal of a respective multiplier 48 which comprises precoder 44. A second input terminal of each multiplier 48 receives a portion $s_j$ of an information stream to be transmitted over the transmitters 40. For example, multiplier $48_j$ receives precoder value $W_j$ and information stream portion $s_j$, and yields the product $s_j W_j$. The products of all of the multipliers 48 are applied to adders 50, each adder 50 being associated with an associated transmitter 40 for feeding the associated transmitter 40 with the signal to be transmitted by the associated transmitter 40.

The signal processor 34 of each wireless terminal 30 serves to process signal(s) received by the wireless terminal 30 and, from the received signals, to discriminate and/or demodulate an estimate of a signal directed to the wireless terminal 30. In order to do so, the signal processor 34 is configured also to make an estimation of how much of its received signal is noise (including signals intended for other wireless terminals in the MU-MIMO environment).

Figure 2:
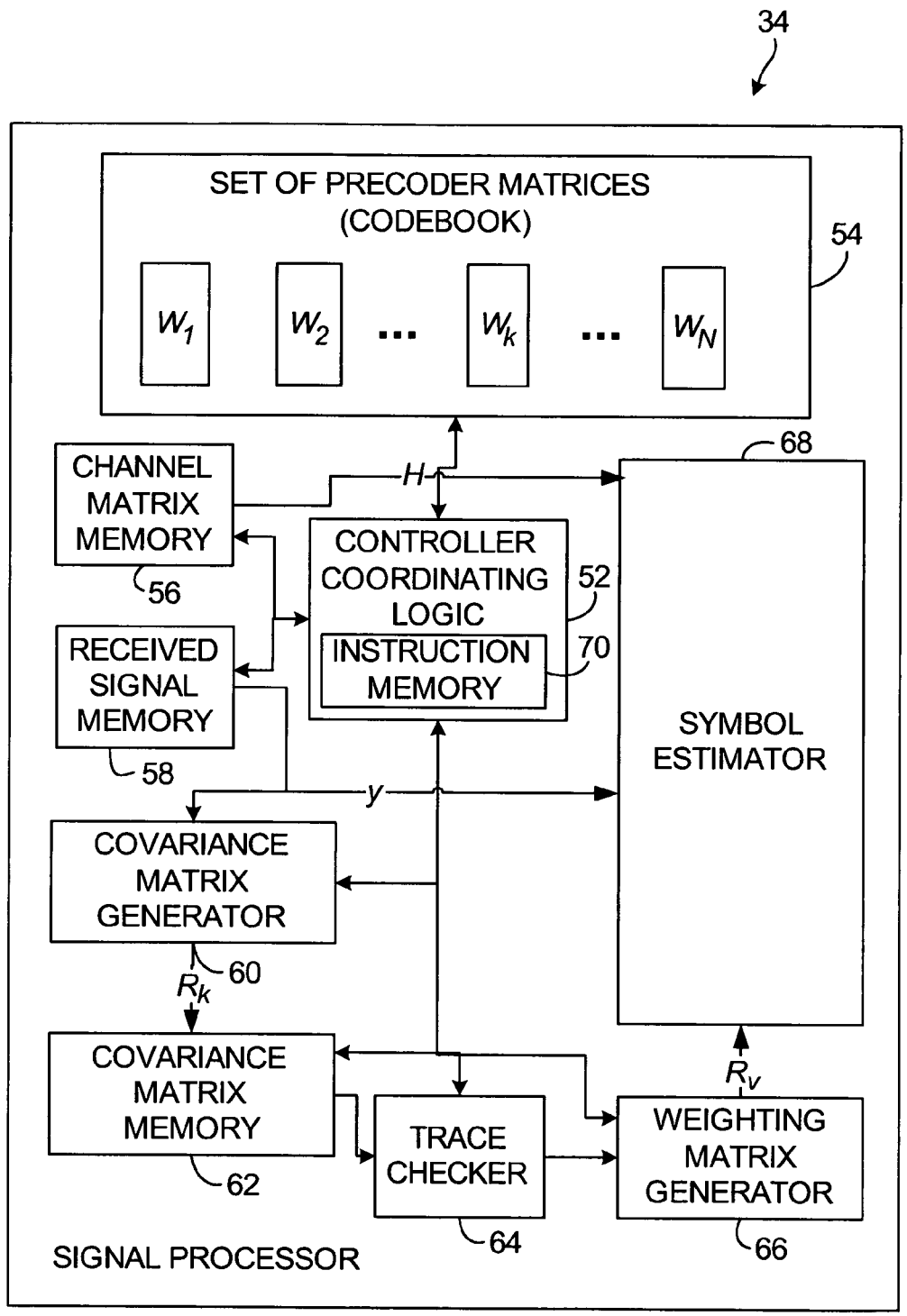
FIG. 2 is a diagrammatic view of a representative, non-limiting example embodiment of signal processor.

Thus, a wireless terminal 30 such as those shown in FIG. 1 comprise an antenna 32 and a signal processor 34. The antenna 32 is configured to receive a received signal which is obtained over wireless interface 22 in the Multiple-Input Multiple-Output (MIMO) system. A representative, non-limiting example embodiment of signal processor 34 is shown in FIG. 2. As understood herein, the signal processor 34 is configured to use the received signal to make a symbol estimate of a symbol included in a transmitted signal intended for the wireless terminal in which the signal processor 34 resides.

In the example, non-limiting embodiment illustrated in FIG. 2, signal processor 34 comprises controller coordinating logic 52; memory 54 (also known as "codebook" memory 54); channel matrix memory 56; received signal memory 58; covariance matrix generator 60; covariance matrix memory 62; trace checker function 64; weighting matrix generator 66; and symbol estimator 68.

The controller coordinating logic 52 coordinates actions of and communications between other constituents elements and functionalities of signal processor 34. In an example mode, the coordination provided by controller coordinating logic 52 results in performance of signal processing reflected by acts such as those subsequently described with reference to FIG. 4. The acts or steps for which controller coordinating logic 52 is configured to execute can be in accordance with instructions (e.g., coded instructions) stored in a memory or media. To this end FIG. 2 shows controller coordinating logic 52 as functioning with instruction memory 70. The controller coordinating logic 52, and indeed all of signal processor 34, can be realized by one or more processor(s) or controller(s) as those terms are herein expansively elaborated.

The codebook memory 54 stores, e.g., a set of precoding matrices depicted in FIG. 2 as precoding matrices $W_1$ through $W_N$. While one of these precoding matrices (e.g., $W_1$) may be used for the transmitted signal (e.g., the signal which is directed by a transmitter(s) to the wireless terminal), at least a subset of precoding matrices in codebook memory 54 (e.g., $W_2$-$W_N$) are candidates for use in transmission of an interfering signal in the MIMO system (e.g., candidates for signals directed to other wireless terminals).

The channel matrix memory 56 stores, e.g., a channel matrix H which is used by symbol estimator 68 for, e.g., the symbol estimate. As indicated above and understood by the person skilled in the art, the channel matrix H is estimated based on reference symbols transmitted from all transmit antennas. The controller coordinating logic 52 or other processor associated with channel matrix memory 56 can estimate the channel matrix H and store the channel matrix H in channel matrix memory 56.

The received signal memory 58 is used to store the received signal y. As herein explained, the received signal y is also used by symbol estimator 68 to make the symbol estimate.

Covariance matrix generator 60 is configured to use the received signal y, channel matrix H, and plural candidates of the subset (e.g., $W_k$, k=2, ... N) to determine corresponding plural covariance matrices $R_k$. Each of the plural covariance matrices $R_k$ is formed by the covariance matrix generator 60 using a corresponding candidate precoding matrix. The plural covariance matrices $R_k$ (k=2, ... N) generated by covariance matrix generator 60 are stored in covariance matrix memory 62 and therein are accessible by trace checker function 64.

Trace checker function 64 is configured to determine which of the candidates (e.g., $W_k$, k=2, ... N) is a trace minimizing candidate. The trace minimizing candidate is associated with one of the plural covariance matrices that has a minimum trace value. As understood by the person skilled in the art, the trace of an n-by-n square matrix A is defined to be the sum of the elements on the main diagonal (the diagonal from the upper left to the lower right) of A, i.e., $$\text{Trace } (A) = a_{11} + a_{22} + \ldots + a_{nn} = \sum_i a_{ii},$$

wherein where $a_{ij}$ represents the entry on the ith row and jth column of A. Equivalently, the trace of a matrix is the sum of its eigenvalues, making it an invariant with respect to chosen basis.

Weighting matrix generator 66 is configured to form a weighing matrix $R_v$ using the trace minimizing candidate obtained from trace checker function 64. The symbol estimator 68 is configured to use, e.g., the weighting matrix $R_v$ obtained from weighting matrix generator 66, the estimate of the channel matrix H obtained from channel matrix memory 56, the received signal y obtained from received signal memory 58 to make a symbol estimate of a symbol included in the transmitted signal that is directed to the wireless terminal in which signal processor 34 resides.

Figure 3:
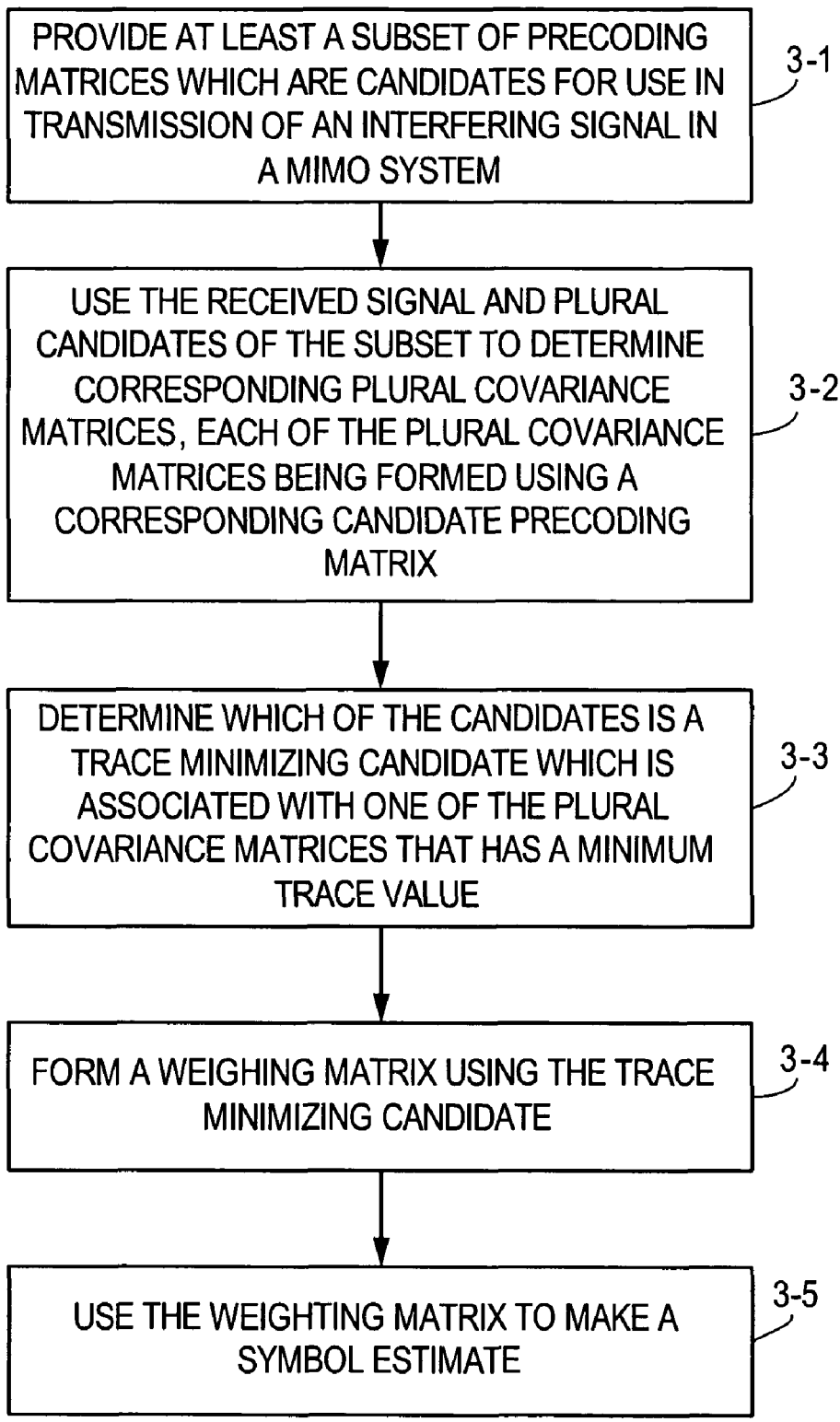
FIG. 3 is a flowchart showing general, representative acts or steps performed in conjunction with a signal processing method according to an example mode.

FIG. 3 shows general, representative acts or steps performed in conjunction with a signal processing method according to an example mode of receiver operation. According to the example mode, signal processor 34 assumes that it knows what the interference attending the transmitted signal is by using a precoding matrix from a finite set of precoders from codebook memory 54. As depicted in FIG. 2, the entries of codebook memory 54 are denoted as $W_k$, k=1, ... , N. For sake of discussion, it is assumed for a particular case that the desired signal (the transmitted signal which is intended by the receiver for reception by this wireless terminal) is transmitted using $W_1$. The interfering signal is then restricted to use $W_k$, k>1. That is, the interfering signal will be one of $W_2$ through $W_N$. Thus, act 3-1 of FIG. 3 comprises providing at least a subset of precoding matrices which are candidates for use in transmission of an interfering signal in a MIMO system.

Act 3-2 comprises using the received signal and plural candidates of the subset to determine corresponding plural covariance matrices. In conjunction with act 3-2, each of the plural covariance matrices is formed using a corresponding candidate precoding matrix. For example, the covariance matrices can be formed using Expression (10).

$$R_k = \begin{pmatrix} \frac{1}{N_{RE}} \sum_{k,l} y(k,l) y(k,l)^H - \\ HW_1 W_1^H H^H - HW_k W_k^H H^H \end{pmatrix}, k > 1 \quad \text{Expression (10)}$$

Act 3-3 comprises determining which of the candidates (i.e., which one of $W_2$ through $W_N$) is a trace minimizing candidate which is associated with one of the plural covariance matrices that has a minimum trace value. In other words, as act 3-3 the trace checker function 64 determines the index k that minimizes Expression (11). The index determined by act 3-3 is now denoted as $k_{min}$.

$$V_k = \text{trace}(R_k^H R_k) \quad \text{Expression (11)}$$

Act 3-4 comprises forming a weighting matrix $R_v$ using the trace minimizing candidate as determined in act 3-3 by trace checker function 64. In the example embodiment shown in FIG. 2, the weighting matrix $R_v$ is formed by weighting matrix generator 66. The weighting matrix generator 66 assumes that an estimate of the covariance of the noise term e is available and that such covariance of the noise term is denoted by $R_e$. The symbol estimator 68 can then form the interference rejection combining (IRC) weighting matrix in accordance with, e.g., Expression (12).

$$R_v = H W_{kmin} W_{kmin}^H H^H + R_e \qquad \text{Expression (12)}$$

Act 3-5 comprises using the weighting matrix $R_v$ to make the symbol estimate $\hat{s}_t$. In the example embodiment shown in FIG. 2, the symbol estimate $\hat{s}_t$ is made by symbol estimator 68. In an example mode, the symbol estimate $\hat{s}_t$ can be made using Expression (13).

$$\hat{s}_i = \lambda g_i^H R_v^{-1} y \qquad \text{Expression (13)}$$

As explained previously, $\lambda$ (see FIG. 13) is a scaling factor that makes the estimator unbiased. The term $g_i^H$ is understood with reference to earlier expression such as Expression (3) and Expression (3b).

Figure 4:
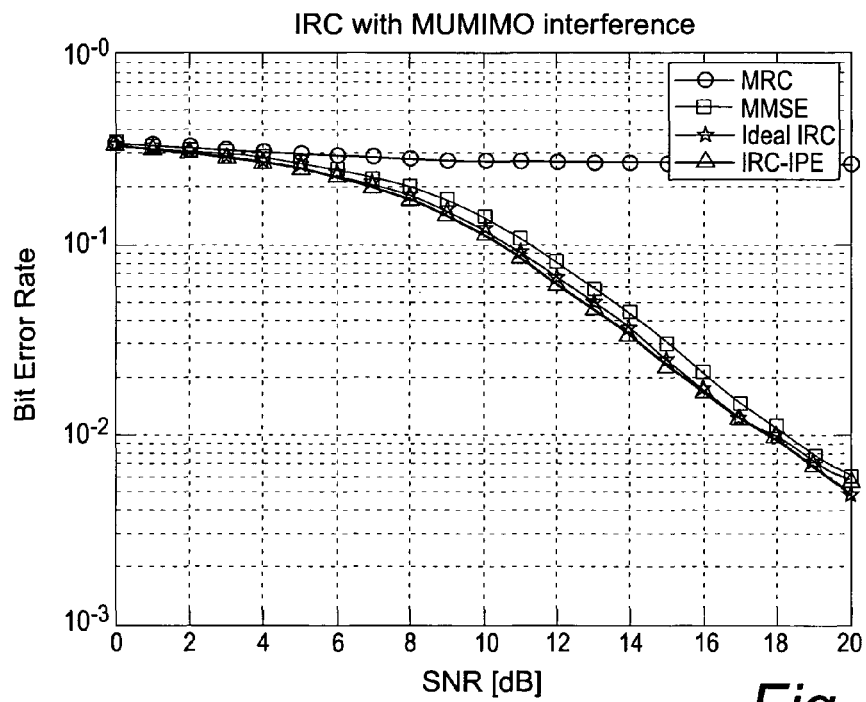
FIG. 4 is a graphical view showing performance of MU-MIMO receivers in an example mode when in presence of an MU-MIMO interferer.

The method above described with reference to FIG. 3 was evaluated and compared with other candidate algorithms. The technology described herein such as the method of FIG. 3 is, for sake of convenience and not by way of limitation, termed or denoted as "IRC-IPE" (Interference Rejection Combining-Interfering Precoder Estimation). FIG. 4 compares the performance/results of IRC-IPE and other symbol estimation techniques in the case when other MU-MIMO users are present. From FIG. 4 it can be seen that the IRC-IPE technique/method outperforms all other methods for this case. Only the "ideal IRC" gives similar performance, but the ideal IRC requires and relies on knowledge of the precoder used by the interferer. FIG. 4 shows that the Minimum Mean Square Error (MMSE) technique receivers perform reasonably well, but the MMSE technique receivers do perform 0.5 dB worse than an IRC-IPE receiver.

It cannot be guaranteed that there is always another MU-MIMO user present. Therefore, in a variation of the method/apparatus described herein, a receiver can also test for the presence of other MU-MIMO users by subtracting only the precoder for the receiver performing the method (e.g., subtracting its own precoder). In Expression (10), if there is no interference the third term (k dependent) will be eliminated and the only subtracted term which remains is the one including the precoder for the desired signal (own precoder).

If the subtraction results indicates that the "no interferer" hypothesis is the strongest (e.g., the most likely), then instead of using the method of FIG. 3 one alternative receiver could be to use Minimum Mean Square Error (MMSE) weights as described with respect to Expression (8) and Expression (9). Yet another alternative is to use Expression (14).

$$\hat{s}(i) = \lambda g_i^H R_e^{-1} y \qquad \text{Expression (14)}$$

Figure 5:
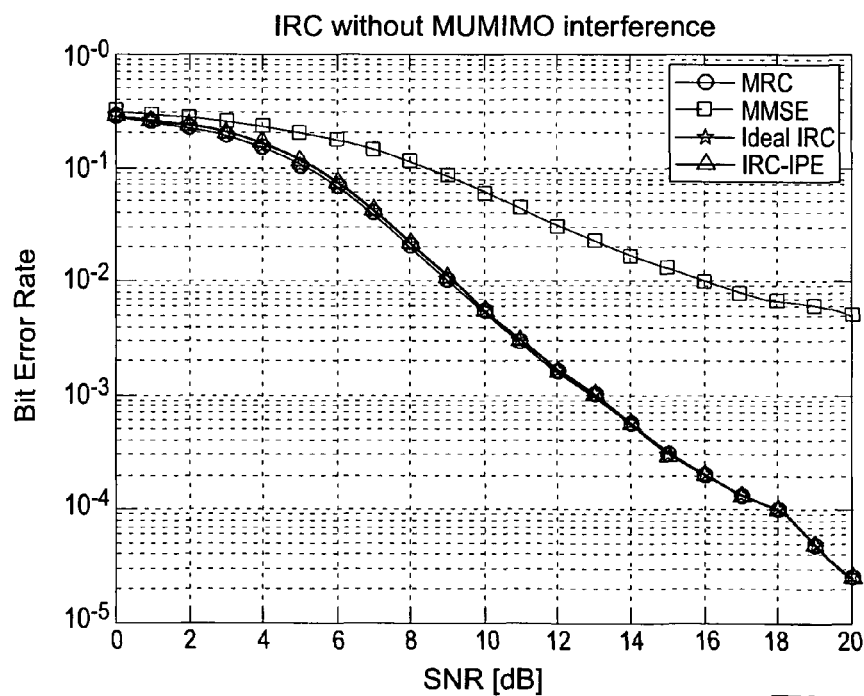
FIG. 5 is a graphical view showing performance of MU-MIMO receivers in an example mode in absence of an MU-MIMO interferer.
Figure 6:
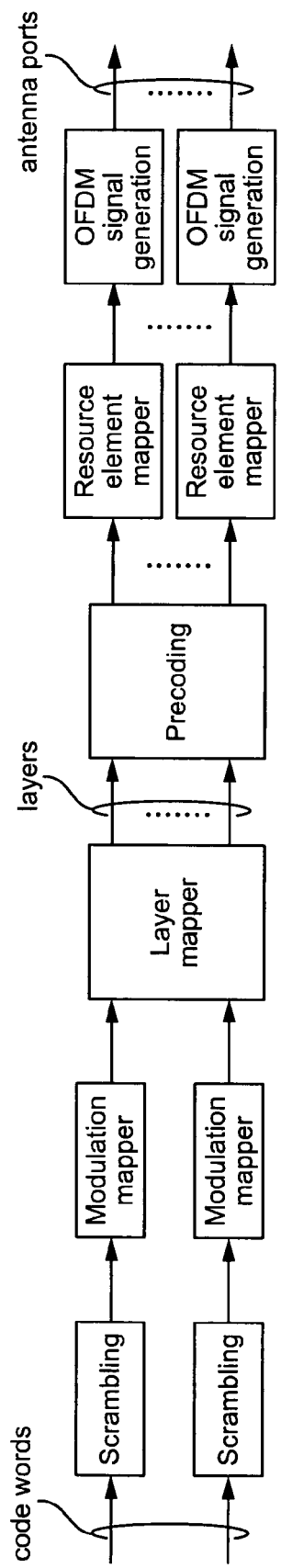
FIG. 6 is a diagrammatic view showing physical channel processing at a transmitter for codewords utilized in MIMO transmission.
Figure 7:
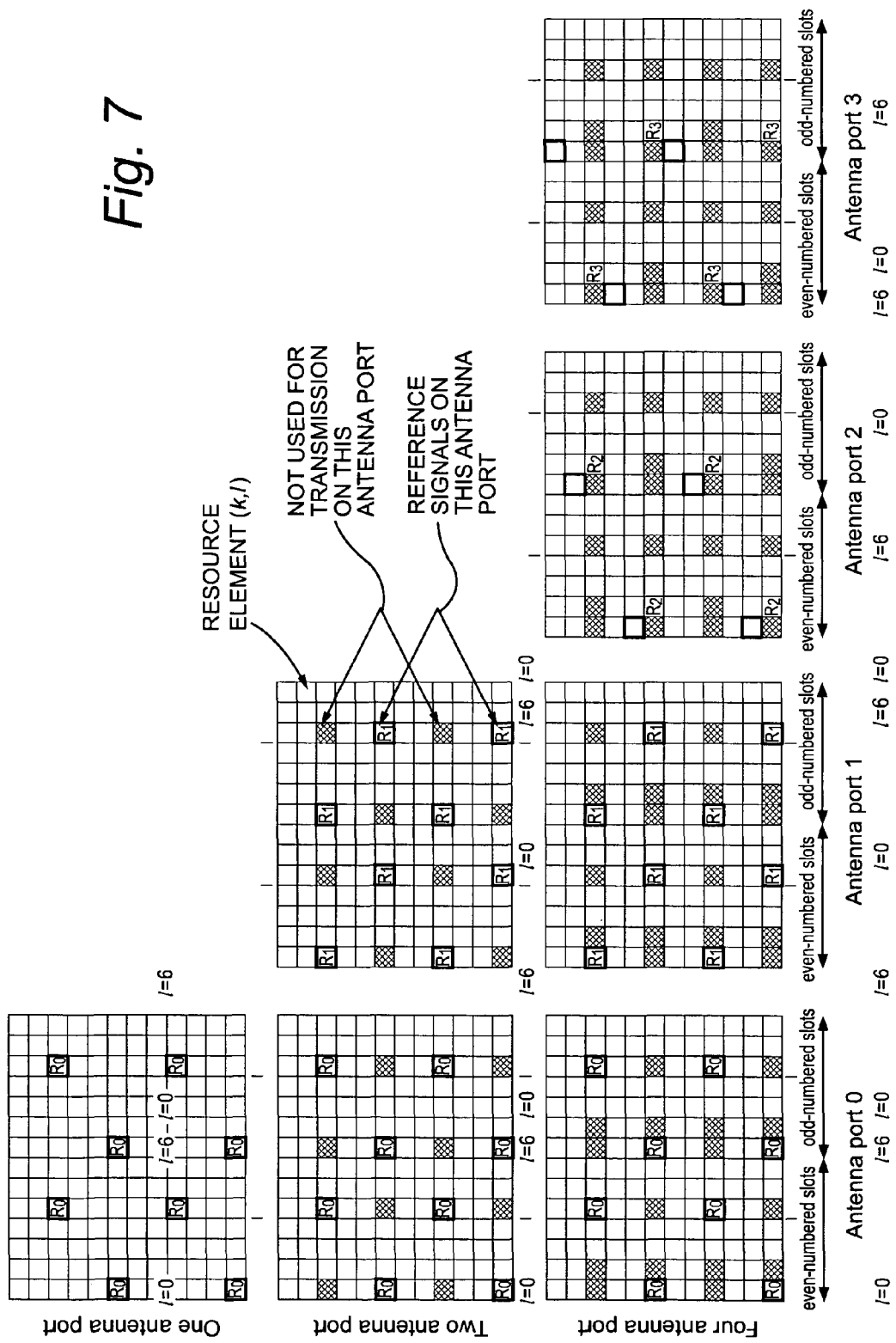
FIG. 7 is a diagrammatic view of a mapping of reference signals to resource elements for multiple antennas.

Expression (14), for the case of assumed uncorrelated noise, coincides with the Maximum Ratio Combining (MRC) weights of Expression (3b). As seen in FIG. 5, the best alternative is to use Maximum Ratio Combining (MRC) weights in this case.

As seen and understood from the foregoing, using the technology described herein MU-MIMO can be supported without explicit need to signal the precoders used by other user equipment units.

Although the description above contains many specificities, these should not be construed as limiting the scope of the invention but as merely providing illustrations of some of the presently preferred embodiments of this invention. Thus the scope of this invention fully encompasses other embodiments which may become obvious to those skilled in the art, and is accordingly not to be limited. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby. Furthermore, no element, component, or method step in the present disclosure is intended to be dedicated to the public regardless of whether the element, component, or method step is explicitly recited in the claims.

The invention claimed is:

1. A method of processing a received signal y for making a symbol estimate $\hat{s}_i$ of a symbol included in a transmitted signal which is transmitted in a Multiple-Input Multiple-Output, MIMO, system, the method characterized by:
   providing at least a subset of precoding matrices W which are candidates for use in transmission of an interfering signal in the Multiple-Input Multiple-Output system;
   using the received signal and plural candidates of the subset to determine corresponding plural covariance matrices R, each of the plural covariance matrices being formed using a corresponding candidate precoding matrix;
   determining which of the candidates is a trace minimizing candidate, the trace minimizing candidate being associated with one of the plural covariance matrices that has a minimum trace value;
   forming a weighting matrix $R_v$ using the trace minimizing candidate;
   using the weighting matrix to make the symbol estimate $\hat{s}_i$.

2. The method of claim 1, further comprising:
   forming each of the plural covariance matrices using the corresponding candidate precoding matrix; a received signal vector; a channel matrix which at least partially describes a channel over which the received signal is transmitted;
   forming the weighing matrix using the trace minimizing candidate, the channel matrix, and a covariance matrix of a noise term.

3. The method of claim 1, further comprising:
   providing a set of precoding matrices;
   associating one of the matrices of the set as a precoding matrix for the transmitted signal, the subset comprising the set excepting the precoding matrix that is associated with the transmitted signal.

4. A wireless terminal comprising an antenna configured to receive a received signal y which is obtained over a wireless interface in a Multiple-Input Multiple-Output, MIMO, system, characterized by:
   a signal processor configured to use the received signal y to make a symbol estimate $\hat{s}_i$ of a symbol included in a transmitted signal intended for the wireless terminal, the signal processor comprising:
   a memory configured to store at least a subset of precoding matrices W which are candidates for use in transmission of an interfering signal in the MIMO system;
   a covariance matrix generator configured to use the received signal and plural candidates of the subset to determine corresponding plural covariance matrices, each of the plural covariance matrices being formed by the covariance matrix generator using a corresponding candidate precoding matrix;
   a trace checker function configured to determining which of the candidates is a trace minimizing candidate which is associated with one of the plural covariance matrices that has a minimum trace value;

a weighting matrix generator configured to form a weighing matrix using the trace minimizing candidate;

a symbol estimator configured to use the weighting matrix to make the symbol estimate.

* * * * *